United States Patent [19]

Gentile

[11] Patent Number: 5,368,488
[45] Date of Patent: Nov. 29, 1994

[54] TALKING BOOK

[76] Inventor: Lawrence F. Gentile, 30 SE. 13th St., Boca Raton, Fla. 34432

[21] Appl. No.: 59,361

[22] Filed: May 11, 1993

[51] Int. Cl.$^5$ .............................................. G09B 5/06
[52] U.S. Cl. .................................................. 434/317
[58] Field of Search ............... 434/308, 309, 311, 317

[56] References Cited

U.S. PATENT DOCUMENTS

| | | | |
|---|---|---|---|
| 2,936,342 | 5/1960 | Kallman | 179/100.2 |
| 3,322,906 | 5/1967 | Rothman . | |
| 3,503,141 | 3/1970 | Schwartz . | |
| 3,583,729 | 6/1971 | DeGroot | 281/31 |
| 3,641,684 | 2/1972 | Paige . | |
| 4,002,355 | 1/1977 | Sendor | 281/29 |
| 4,021,932 | 5/1977 | Lipps | 434/317 |
| 4,189,852 | 2/1980 | Chatlien . | |
| 4,636,881 | 1/1987 | Brefka et al. | 360/74.1 |
| 4,884,974 | 12/1989 | DeSmet | 434/317 |
| 4,997,374 | 3/1991 | Simone | 434/317 |

*Primary Examiner*—Gene Mancene
*Assistant Examiner*—Jeffrey A. Smith
*Attorney, Agent, or Firm*—Oltman and Flynn

[57] ABSTRACT

A talking book and audio player apparatus includes a book having a back face, a mounting platform attached to the back face, a cassette tape mounted within the mounting platform, the book, mounting platform and tape together forming a cartridge, and a player base assembly for removably receiving the mounting platform and for playing the tape, so that the user can play the tape while following printed contents of the book, and such that any of several book and tape cartridges can be inserted into the base assembly to provide variety and selection of reading material. The player base assembly preferably includes a housing having a top wall portion and a recessed area in the top wall portion for receiving the mounting platform so that the book is positioned for use, a mechanism for removably connecting the mounting platform to the top wall portion, and a cassette tape player within the housing having elements positioned to engage and play the tape when the mounting platform is inserted into the recessed area. The mounting platform preferably includes a shell member attached to the back face and having an indentation at its margin in which the cassette tape is retained. The player base assembly preferably includes sliding shafts extending into the housing for operating control buttons of the tape player.

7 Claims, 3 Drawing Sheets

001
TALKING BOOK

BACKGROUND OF THE INVENTION

1. Field of the Invention

The present invention relates generally to the field of instructional kits combining books with corresponding sound recordings for teaching reading skills, and more specifically to a combined book and cassette tape cartridge and a player base assembly for receiving the book and tape cartridge, the cartridge including a mounting platform attached to the book back cover and a cassette tape relating to the contents of the book secured within an edge of the mounting platform, and the player base assembly including a housing having a top recessed area for receiving the mounting platform so that the book is positioned for use, a mechanism for removably engaging the mounting platform to anchor the cartridge to the base assembly, a cassette tape player secured within the housing having its spindles and capstan extending into the recessed area to receive the cassette tape when the platform is inserted into the recessed area and the playing head oriented to engage the tape when the player is operated, the tape player speaker being mounted inside the housing adjacent sound release portals in the housing wall, and sliding shafts extending into the housing for operating tape player controls, so that the user can play the tape while following the book text from page to page, and such that any of several such book and tape cartridges can be inserted into the base assembly to provide variety and selection in reading material.

2. Description of the Prior Art

There have long been written texts sold in combination with sound recordings for teaching reading skills and foreign language pronunciation. In many such combination kits the sound recording, typically a cassette tape or phonograph record, and text are provided together but are separable. One of the two might be lost, leaving the remaining book or sound recording portion essentially useless. If several such combination kits are purchased, the books and sound recordings can easily become mixed up with each other. In some kits the sound recording and playing device are both permanently attached to or integrated into the particular book. As a result, another playing device has to be purchased each time a different book is desired, forcing a wasteful and expensive duplication of equipment.

Paige, U.S. Pat. No. 3,641,684, issued on Feb. 15, 1972, teaches a talking book including a housing having the appearance of a book, and containing an audio tape player and replaceable text pages. A variety of different text pages and corresponding tapes can be inserted. A problem with Paige is that a conventional book cannot be readily adapted for use. Special insertable pages must be prepared. A child does not gain familiarity with conventional books, but only with the special housing unit. Another problem is that the tapes and text pages can be mixed up or lost, as mentioned above. Another problem is that the pages and tape must be inserted separately, so that changing the reading material is inconvenient.

Kallmann, U.S. Pat. No. 2,936,342, issued on May 10, 1960, discloses a talking book and tape player apparatus where the book has a magnetic sound track on each page. The player is placed against the page over the sound track and a playing head within the apparatus scans along the track. A problem with Kallmann is that the sound track on the page is necessarily so short that only a few seconds of sound can be reproduced. This would rarely be sufficient to reproduce all the words on a full printed page. Another problem is that the apparatus must be positioned on each and every page, making it laborious to use.

Chatlien, U.S. Pat. No. 4,189,852, issued on Feb. 26, 1980, reveals a method of teaching reading. The student follows the words in a book while the same words are being audibly reproduced, and writes words or statements as directed by audible instructions. A problem with Chatlien is that the text and magnetic tape can become separated, lost or mixed up with other such texts or tapes. The added step of writing is of questionable value and does nothing to solve this problem.

Sendor, U.S. Pat. No. 4,002,355, issued on Jan. 11, 1977, teaches a book binder containing sheets of reading material and a thick panel having recesses for retaining related cassette tapes. Additional recesses are optionally provided for projector slides. Schwartz, U.S. Pat. No. 3,503,141, issued on Mar. 31, 1970, discloses a book binder much like that of Sendor. Schwartz has a thick cover with tape receiving recesses, tape spool locking projections, and ribbons for popping the tapes out of the recesses. DeGroot, U.S. Pat. No. 3,583,729, issued on Jun. 8, 1971, discloses a book binder containing a central audio storage case with text pages clipped on either side of the storage case. One or two tape receiving recesses are provided in the faces of the storage case. A problem with Sendor, Schwartz and DeGroot is that the tapes can become separated from the binder or case and lost, or mixed up with other cassette tapes.

Brefka, U.S. Pat. No. 4,636,881, issued on Jan. 13, 1987, discloses a talking book in the form of a notebook in which text pages can be removably inserted. Mounted inside the cover of the notebook is a tape player and infrared detection device for sensing the turning of pages. The turning of a page activates a switch and logic circuitry causing the tape player to recite information relating to the written content of the open page. A problem with Brefka is that a conventional book cannot be readily adapted for use with the device. Children using Brefka would not gain hands-on familiarity with an ordinary book. Also, a tape corresponding to the particular text must be separately inserted. This not only adds a step when changing the text, but permits separation and loss of text or tape. The logic circuitry also makes Brefka relatively complex and prone to failure.

DeSmet, U.S. Pat. No. 4,884,974, issued on Dec. 5, 1989, reveals an interactive talking book and audio player assembly. The book includes a read-only memory chip, or ROM, attached at its margin and containing audio information relating to the contents of the book in binary form. The ROM has elements which fit into a player, which may include a microprocessor and which audibly reproduces the contents of the ROM. A problem with DeSmet is that it is complex and thus more failure prone. Another problem is the vocal sound quality of a ROM and microprocessor are typically poor compared with magnetic tape or other more conventional sound storage media.

It is thus an object of the present invention to provide a talking book apparatus which permanently joins a written text with a corresponding sound recording so that they cannot become separated and mixed up with other texts and recordings.

It is another object of the present invention to provide such an apparatus in which the text takes the form of a conventional book so that children using the apparatus gain familiarity and comfort with, and an interest in books.

It is still another object of the present invention to provide such an apparatus which gives the high quality sound reproduction of magnetic tape, and of sufficient duration to recite all words in the text.

It is finally an object of the present invention to provide such an apparatus which can be easily used and inexpensively manufactured.

SUMMARY OF THE INVENTION

The present invention accomplishes the above-stated objectives, as well as others, as may be determined by a fair reading and interpretation of the entire specification.

A talking book and audio player apparatus is provided which includes a book having a back face, a mounting platform attached to the back face, a cassette tape mounted within the mounting platform, the book, mounting platform and tape together forming a cartridge, and a player base assembly for removably receiving the mounting platform and for playing the tape, so that the user can play the tape while following printed contents of the book, and such that any of several book and tape cartridges can be inserted into the base assembly to provide variety and selection of reading material. The player base assembly preferably includes a housing having a top wall portion and a recessed area in the top wall portion for receiving the mounting platform so that the book is positioned for use, a mechanism for removably connecting the mounting platform to the top wall portion, and a cassette tape player within the housing having elements positioned to engage and play the tape when the mounting platform is inserted into the recessed area. The mounting platform preferably includes a shell member attached to the back face and having an indentation at its margin in which the cassette tape is retained. The player base assembly preferably includes sliding shafts extending into the housing for operating control buttons of the tape player.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

Figure 1:
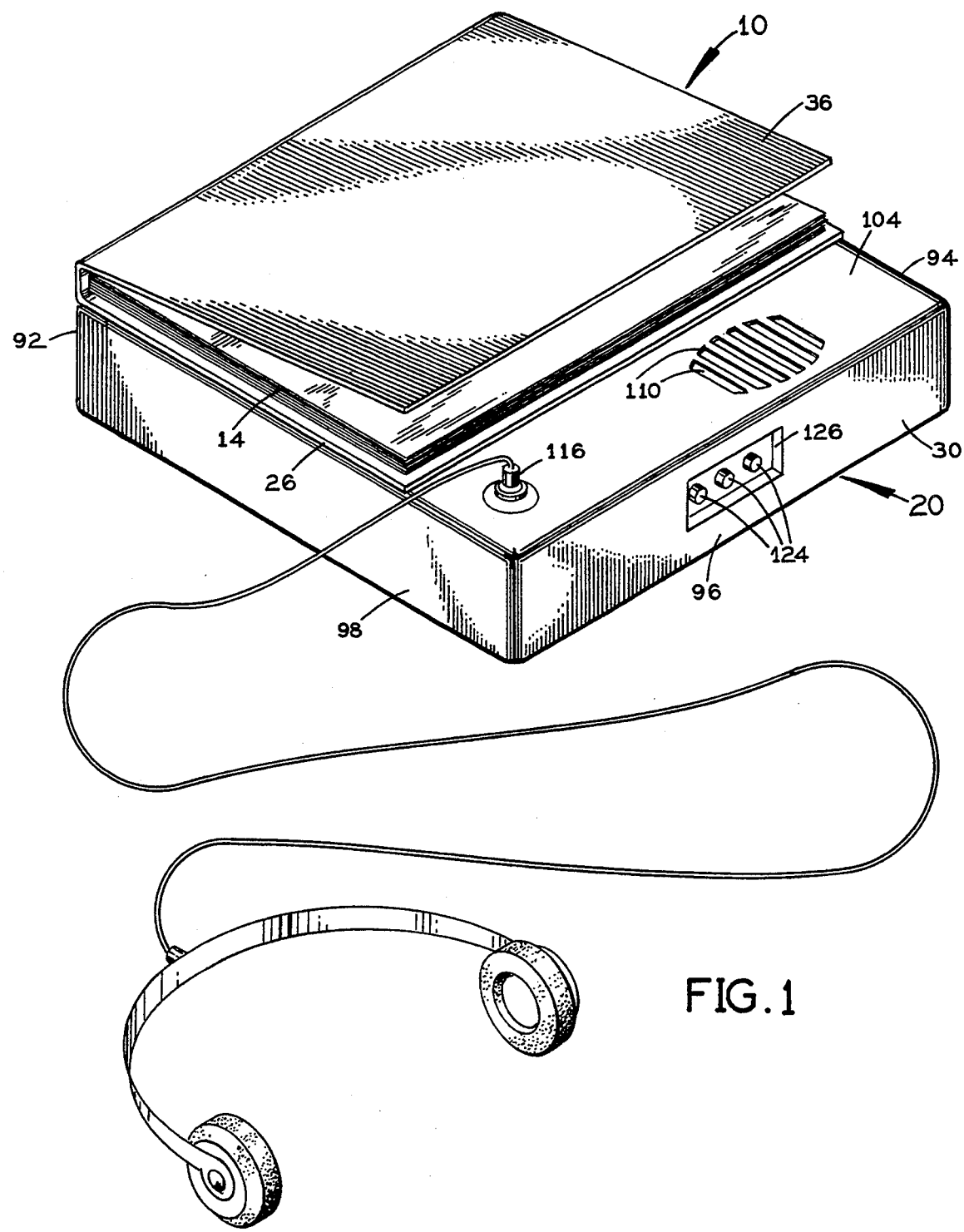
FIG. 1 is a perspective view of the inventive talking book apparatus, showing the book and tape cartridge mounted in the base assembly, with headphones plugged into the jack.
Figure 2:
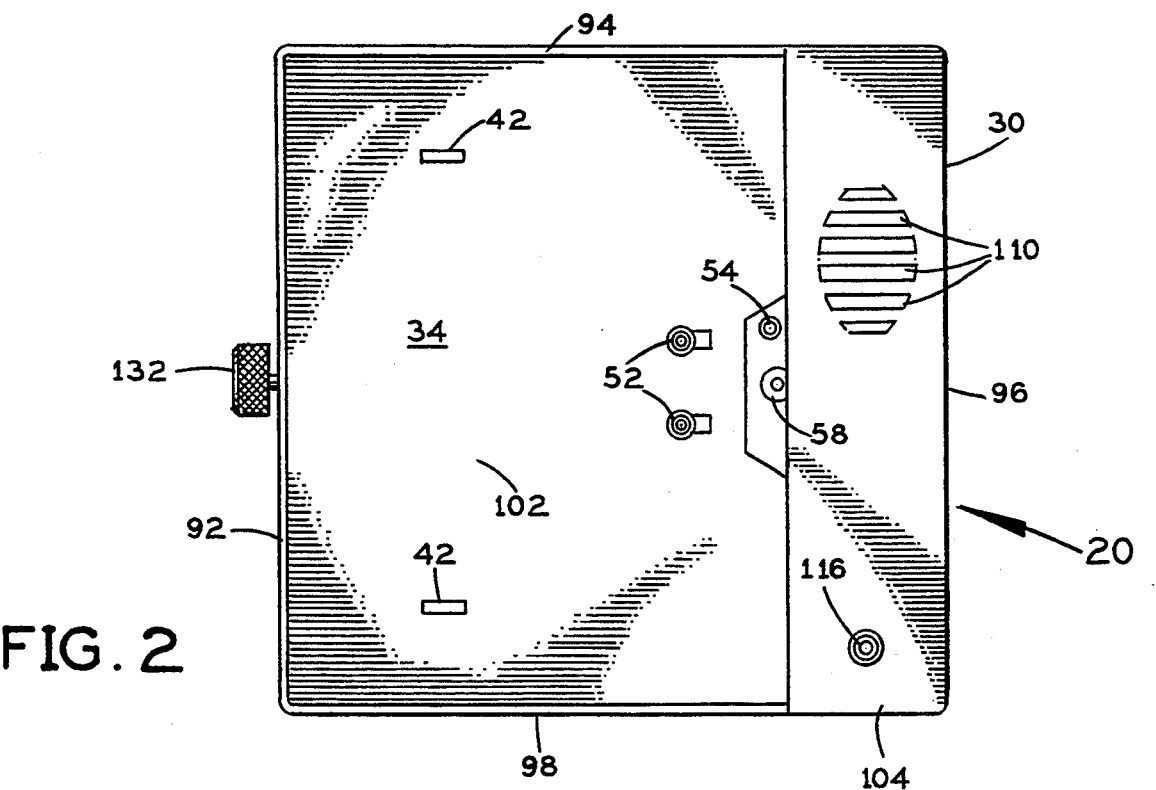
FIG. 2 is a top view of the base assembly without the cartridge, revealing the recessed area, the tape player spindles and capstan, and the mounting platform engaging hooks.
Figure 3:
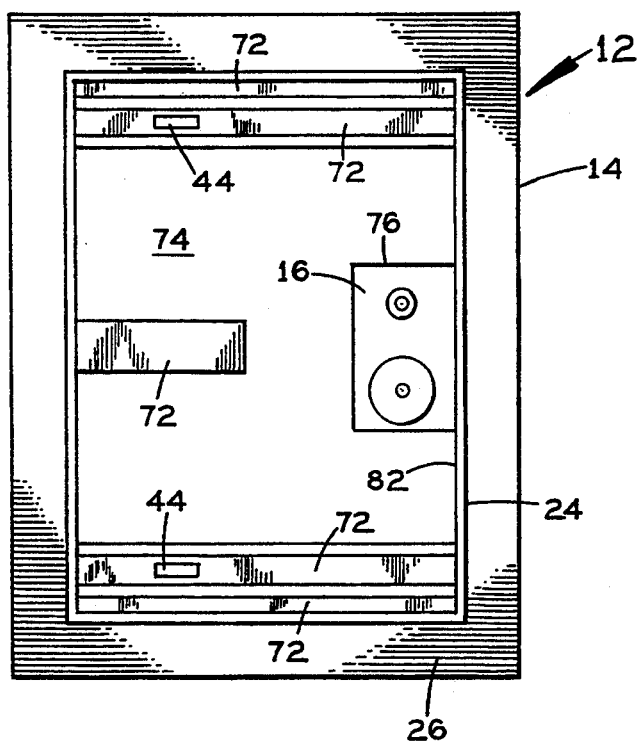
FIG. 3 is a bottom view of a book and tape cartridge, showing the mounting platform attached to the back cover of the book, and the mounting platform bottom face corrugations, the cassette tape and the engaging slots.
Figure 4:
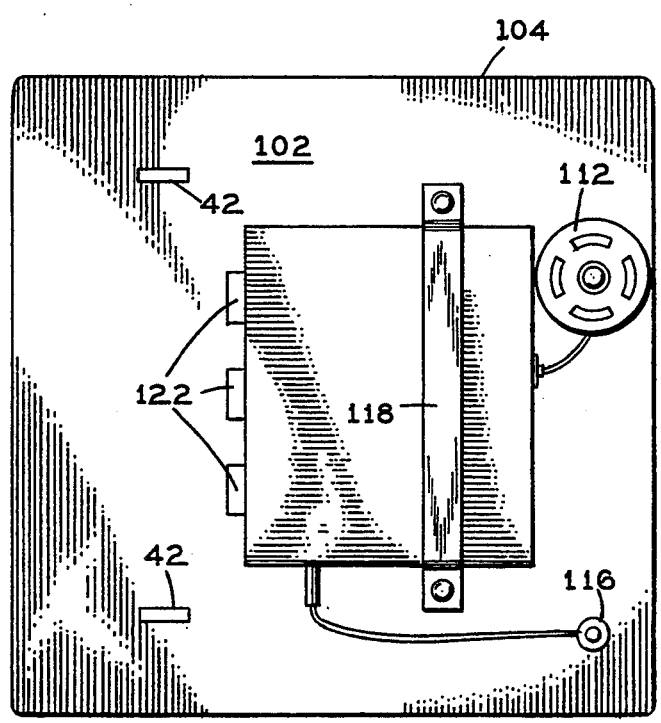
FIG. 4 is a bottom view of the base assembly top wall portions, revealing the tape player connected under these portions with a metal strap, the speaker and the headphone jack.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Referring to FIGS. 1-5, a talking book apparatus 10 is disclosed for teaching reading skills. Apparatus 10 includes a cartridge 12 combining a book 14 with a corresponding audio cassette tape 16, and a player base assembly 20. See FIG. 1.

Cartridge 12 includes a mounting platform 24 glued to the book back cover 26. Tape 16 is incorporated into the margin of platform 24 and contains speech corresponding to the written contents of book 14. See FIG. 2.

Player base assembly 20 includes a shallow, wide housing 30 having a recessed top area 34 for receiving mounting platform 24. See FIG. 3. The front cover 36 of book 14 is directed generally upward when cartridge 12 is mounted on base assembly 20 so that book 14 is positioned to be opened and read. A locking mechanism with engaging hooks 42 is provided for removably engaging slots 44 in mounting platform 24 to anchor platform 24 to player base assembly 20. A tape player is contained within housing 30 and has conventional tape rotating spindles 52 and a capstan 54 extending into recessed top area 34 to engage cassette tape 16 when platform 24 is inserted into recessed top area 34. See FIG. 4. Player 50 has a playing head 58 which is oriented to engage tape 16 when player 50 is operated.

As a result, a tape 16 can be played while an attached book 14 is mounted on housing 30 and the user can listen to tape 16 while following the text in the book 14 from page to page. A collection of such books 14 with attached matching tapes 16 can be gathered for insertion into player base assembly 20, providing the user with variety and selection in reading material.

Mounting platform 24 is preferably a square plastic bubble having corrugations 72 in its bottom face 74 for increased strength. See FIG. 2. Tape 16 is glued into a rectangular cavity 76 at an edge 82 of platform 24. The exposed tape segment is directed toward edge 82 for engagement with playing head 58. Slots 44 are parallel, spaced apart and are cut into downward troughs of corrugations 72.

Housing 30 preferably includes a bottom wall 90, side walls 92, 94, 96 and 98, and top wall portions 102 and 104. Top wall portion 104 is continuous with the upper edges of side walls 92-98, and includes sound release portals 110. A speaker 112 is fastened to the inner surface of top wall portion 104 below portals 110, and a headphone receiving jack 116 extends into top wall portion 104. Top wall portion 102 is below the level of top wall portion 104 to form recessed top area 34 to receive platform 24. Tape player 50 is secured with a strap 118 to the inner surface of top wall portion 102. Tape player buttons 122 are aligned with and engaged by spring-loaded control rods 124 mounted in channel 126 in side wall 96. See FIG. 5.

Figure 5A:
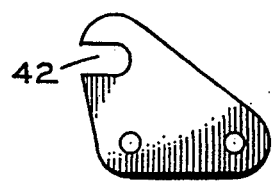
FIG. 5a shows an engaging hook cut out of a plate.
Figure 5:
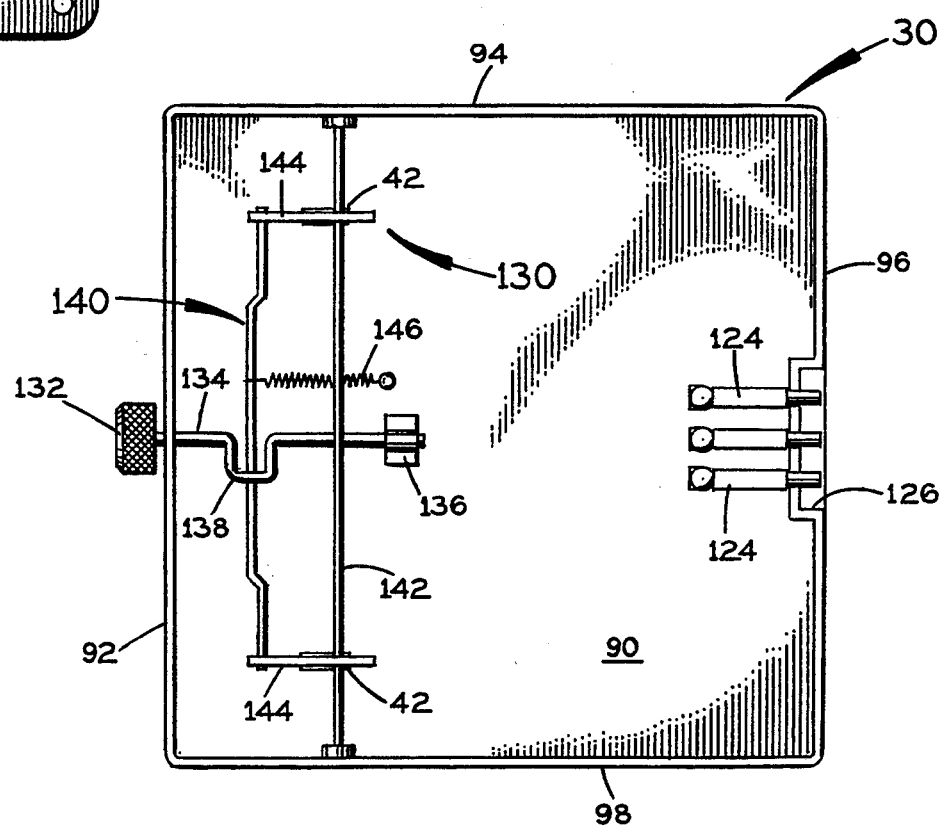
FIG. 5 is a top view of the base assembly with the top wall portions removed to reveal the cartridge engaging assembly.

Hooks 42 are preferably moved from a position engaging the edges of slots 44 to one disengaging these edges with an engaging assembly 130. Assembly 130 includes a control knob 132 mounted on end of a shaft 134 extending through side wall 92 into housing 30. See FIG. 5. The other end of shaft 134 is rotatably mounted in a socket 136. Between knob 132 and socket 136 a U-segment is provided in shaft 134. When knob 132 and shaft 134 are rotated, U-segment 138 rotates down against a radial pivot assembly 140 extending from a perpendicular, rotatably mounted second shaft 142. Hooks 42 are preferably notches cut in plates 144 extending radially from a second shaft 142. See FIG. 5a. A coil spring 146 preferably biases hooks 42 in the slot 44 engaging position.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A talking book and audio player apparatus comprising:

a book having a back face, a mounting platform attached to said back face, a cassette tape mounted within said mounting platform, said book, mounting platform and tape together forming a cartridge, a player base assembly for removably receiving said mounting platform and for playing said tape, a cassette tape player having control buttons in said player base assembly, sliding shafts each with one end exterior to the player base assembly and a second end extending into said player base assembly for operating the control buttons on said lane player, so that the user can operate and control the playing of said tape while following printed contents of said book, and such that any of several said book and tape cartridges can be inserted into said base assembly to provide variety and selection of reading material.

2. An apparatus according to claim 1, the mounting platform further including:

molded corrugations.

3. An apparatus according to claim 2, wherein the molded corrugations are formed from:

a plastic.

4. An apparatus according to claim 1, further comprising:

hooks located on a lower surface of the cartridge, slots located on an upper surface of the player base assembly for mateably engaging the hooks.

5. An apparatus according to claim 4, further comprising:

a control knob rotatable to cause the hooks to engage and disengage from the slots.

6. A talking book and audio player apparatus comprising:

a book having a back face, a mounting platform attached to said back face, a cassette tape mounted within said mounting platform, said book, mounting platform and tape together forming a cartridge, hooks located on a lower surface of the cartridge, a player base assembly having slots on an upper surface for removably receiving said hooks on the mounting platform, and for playing said tape, so that the user can operate and control the playing of said tape while following printed contents of said book, and such that any of several said book and tape cartridges can be inserted into said base assembly to provide variety and selection of reading material.

7. An apparatus according to claim 6, further comprising:

a control knob rotatable to cause the hooks to mateably engage and disengage from the slots.

* * * * *